(12) United States Patent
Gautam et al.

(10) Patent No.: US 12,363,563 B2
(45) Date of Patent: Jul. 15, 2025

(54) METHODS AND SYSTEMS FOR NETWORK SLICE SUBNET CAPABILITY MANAGEMENT

(71) Applicant: Samsung Electronics Co., Ltd., Suwon-si (KR)

(72) Inventors: Deepanshu Gautam, Bangalore (IN); Ashutosh Kaushik, Bangalore (IN); Varadarajan Seenivasan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 360 days.

(21) Appl. No.: 17/819,225

(22) Filed: Aug. 11, 2022

(65) Prior Publication Data

US 2023/0072212 A1    Mar. 9, 2023

(30) Foreign Application Priority Data

Aug. 11, 2021 (IN) .............................. 202141036422
Jul. 15, 2022 (IN) .............................. 202141036422

(51) Int. Cl.
 *H04W 24/04* (2009.01)
 *H04L 41/0866* (2022.01)
 *H04L 41/5003* (2022.01)
 *H04W 28/16* (2009.01)
 *H04W 88/18* (2009.01)

(52) U.S. Cl.
 CPC ......... *H04W 24/04* (2013.01); *H04L 41/0866* (2013.01); *H04L 41/5003* (2013.01); *H04W 28/16* (2013.01); *H04W 88/18* (2013.01)

(58) Field of Classification Search
 CPC ..... H04W 24/04; H04W 28/16; H04W 88/18; H04L 41/0866; H04L 41/5003;
(Continued)

(56) References Cited

U.S. PATENT DOCUMENTS 11,039,321 B2 * 6/2021 Senarath ............. H04L 41/0896
11,304,060 B2 * 4/2022 Xu .......................... H04L 67/61
(Continued)

FOREIGN PATENT DOCUMENTS

EP       3609129 A1    2/2020
WO    2021054732 A1    3/2021

OTHER PUBLICATIONS

International Search Report and Written Opinion of the International Searching Authority dated Nov. 15, 2022, in connection with International Application No. PCT/KR2022/011940, 8 pages.
(Continued)

*Primary Examiner* — Kabir A Timory (57) ABSTRACT

Embodiments herein disclose methods and systems for managing capabilities of network slice subnets in fifth generation (5G) communication networks. The network slice management function (NSMF) queries the existing network slice subnet's capabilities to determine if the existing network slice subnet can satisfy a network slice requirement. The NSMF receives the capability information of the existing network slice subnet by sending a request to the network slice subnet management function (NSSMF). The capability information of the existing network slice subnet is stored in at least one attribute of an information object class (IOC), wherein the IOC is created by the NSSMF.

16 Claims, 8 Drawing Sheets

(58) Field of Classification Search
CPC ............ H04L 43/0852; H04L 43/0894; H04L 41/5009; H04L 41/5019; H04L 41/5051; H04L 41/0895; H04L 41/40
See application file for complete search history.

(56) References Cited

U.S. PATENT DOCUMENTS

| | | | |
|---|---|---|---|
| 11,411,824 B2 * | 8/2022 | Katsalis | ............ H04L 41/5009 |
| 2018/0317134 A1 | 11/2018 | Leroux et al. | |
| 2019/0223055 A1 | 7/2019 | Bor Yaliniz et al. | |
| 2020/0059407 A1 | 2/2020 | Lu et al. | |

OTHER PUBLICATIONS

3GPP TS 28.531 V17.0.0 (Jun. 2021), Technical Specification, 3rd Generation Partnership Project; Technical Specification Group Services and System Aspects; Management and orchestration; Provisioning; (Release 17), Jun. 2021, 73 pages.

3GPP TS 23.501 V17.5.0 (Jun. 2022), Technical Specification, 3rd Generation Partnership Project; Technical Specification Group Services and System Aspects; System architecture for the 5G System (5GS); Stage 2 (Release 17), Jun. 2022, 568 pages.

3GPP TS 28.530 V17.2.0 (Dec. 2021), Technical Specification, 3rd Generation Partnership Project; Technical Specification Group Services and System Aspects; Management and orchestration; Concepts, use cases and requirements (Release 17), Dec. 2021, 37 pages.

3GPP TS 28.531 V17.4.0 (Jun. 2022), Technical Specification, 3rd Generation Partnership Project; Technical Specification Group Services and System Aspects; Management and orchestration; Provisioning; (Release 17), Jun. 2022, 73 pages.

Supplementary European Search Report dated Dec. 8, 2023, in connection with European Patent Application No. 22856226.0, 10 pages.

Examination report dated Mar. 15, 2023, in connection with Indian Application No. 202141036422, 6 pages.

* cited by examiner

METHODS AND SYSTEMS FOR NETWORK SLICE SUBNET CAPABILITY MANAGEMENT

CROSS REFERENCE TO RELATED APPLICATIONS

This application is based on and derives the benefit of Indian Provisional Application 202141036422 filed on Aug. 11, 2021, and Indian Non-Provisional Application No. 202141036422 filed on Jul. 15, 2022, the contents of which are incorporated herein by reference.

BACKGROUND

1. Field

Embodiments disclosed herein relate to fifth generation (5G) networks and more particularly to managing capabilities of network slice subnets in 5G networks.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

As defined in the third-generation partnership project (3GPP) technical specification (TS) 23.501, the 5G system comprises the 5G access network (AN), the 5G core network (CN) and the user equipment (UE). The 5G system may be expected to provide optimized support for a variety of different communication services, different traffic loads, and different end user communities. For example, the communication services using network slicing may include vehicleto-everything (V2X) services. The 5G system aims to enhance its capability to meet key performance indicators (KPIs) that emerging V2X applications may require. For these advanced V2X applications, the requirements, such as data rate, reliability, latency, communication range and speed, may be more stringent.

As one of the key technologies to enable network slicing, fixed mobile convergence (FMC)—which includes wireless-to-the-everything (WTTx) and fibre-to-the-everything (FTTx)—is expected to provide native support for network slicing. For optimization and resource efficiency, the 5G system may select the most appropriate 3GPP or non-3GPP access technology for a communication service, potentially allowing multiple access technologies to be used simultaneously for one or more services active on a UE. Support for massive Internet of Things (mIoT) can bring many new requirements in addition to mobile broadband (MBB) enhancements. Communication services with massive IoT connections, such as smart households, smart grid, smart agriculture and smart meter may require the support of a large number and high density IoT devices to be efficient and cost effective.

Operators can use one or more network slice instances to provide these communication services, which require similar network characteristics, to different vertical industries. 3GPP TS 28.530 and 28.531 have defined the management of Network Slice in 5G networks. They have also defined the concept of Communication Services, which may be provided using one or multiple network slices. A network slice instance (NSI) may support multiple communication service instances (CSIs). Similarly, a CSI may utilize multiple NSIs.

The current network slicing specification does not provide a mechanism where the existing slice's subnet capabilities can be stored and managed. The functionality of "deciding if the existing slice can be used for the new slice allocation request" cannot be achieved or fulfilled unless the network slice subnet (NSS) network resource model (NRM) supports maintaining the capabilities or features of the existing network slice subnets. The network slice management function (NSMF) may have to query the network slice subnet management function (NSSMF) for existing network slice subnet capabilities.

Figure 1:
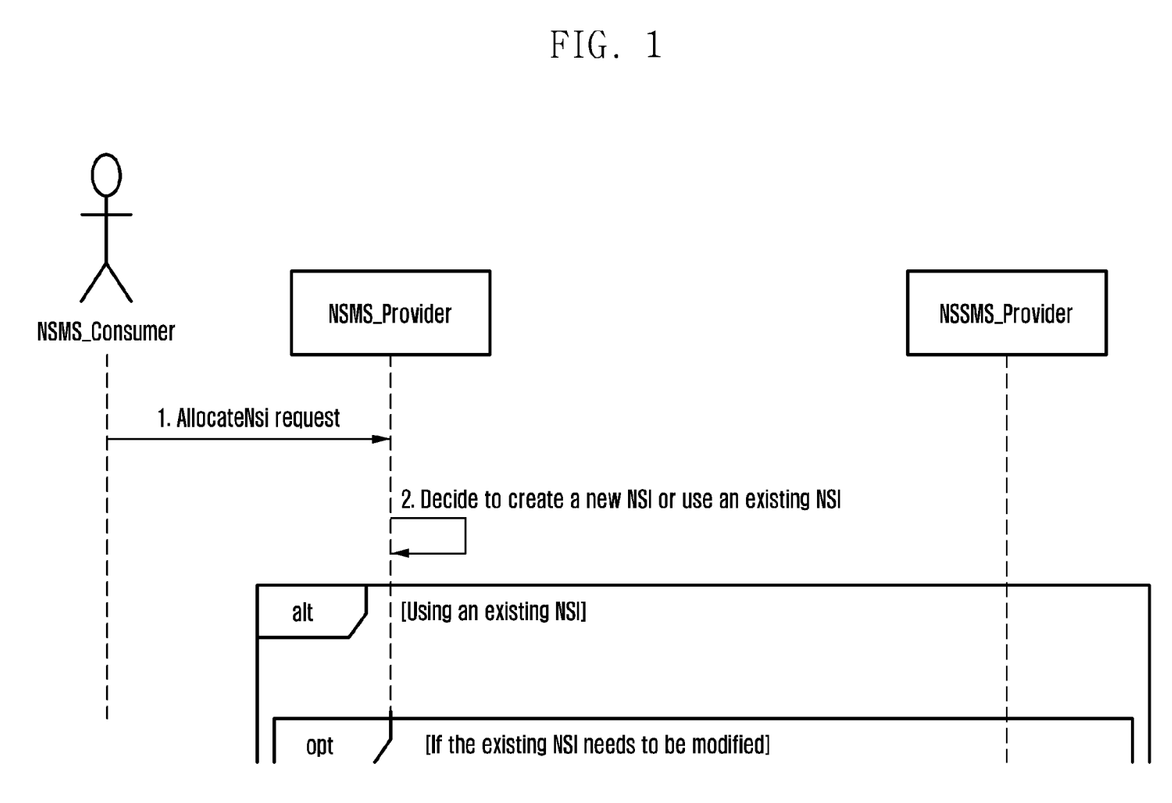
FIG. 1 illustrates the procedure of creating a new NSI or using an existing NSI to satisfy the required network slice related requirements.

The issue with the current network slicing specification may further be apparent through FIG. 1, which depicts a procedure for creating a new NSI or using an existing NSI to satisfy a required network slice related requirement. Here, the network slice management Service_Consumer (NSMS_C) may transmit a NSI allocation request to the NSMS_Provider (also referred to herein as NSMF) to satisfy a network slice related requirement. However, instead of querying the NSSMS_Provider (also referred to herein as NSSMF) to determine if the existing slice subnet has the capability to satisfy the network slice related requirement, the NSMS_Provider decides on its own as to whether to create a new NSI or use an existing NSI to satisfy the network slice related requirement. Moreover, the NRM definition does not include the network slice subnet capabilities.

Furthermore, the current slice model includes ServiceProfile and SliceProfile to provide the requirements for the network slice and the network slice subnet, respectively. However, the current slice model does not provide the features or capabilities of the instantiated slice or network slice subnet. The requirements of the existing slice may differ from the actual capability of the existing slice.

For example, the maxNumberofUEs requirement can state 100. However, the actual number configured may be 90. This can be either due to resource shortage or the optimal resource planning. In another example, the latency requirement of a slice can state 10 ms. However, this 10 ms may be divided into respective network slice subnet as the capability of the individual network slice subnet.

The principal object of the embodiments herein is to disclose methods and systems for managing capabilities of network slice subnets in 5G communication networks, wherein the network slice subnet capabilities are managed in such a way that the network slice subnet capabilities can assist in determining whether a new network slice instance is needed, or an existing network slice instance can be utilized to fulfill the network slice instance allocation request.

SUMMARY

Accordingly, the embodiments herein provide methods and systems for managing capabilities of network slice subnets in 5G communication networks.

A method disclosed herein comprises sending by a first network function (NF), a request to a second NF to determine a capability information of one or more network slice subnets. The method further comprises receiving by the first NF, a response comprising the capability information of the one or more network slice subnets from the second NF. The method further comprises determining by the first NF, if based on the capability information, the one or more network slice subnets can satisfy a network slice requirement. The method further comprises creating by the first NF, a new NSI if based on the received capability information, it is determined that the one or more network slice subnets cannot satisfy the network slice requirement. The method further comprises continuing with the existing NSI if based on the received capability information, it is determined that the one or more network slice subnets can satisfy the network slice requirement.

The first NF may send the request to the second NF using getMOIAttributes operation. The second NF may create an information object class (IOC) having at least one attribute, wherein the at least one attribute includes the capability information of the one or more network slice subnets, The first NF may request the capability information through the getMOIAttributes operation to the second NF, for receiving the capability information of the one or more network slice subnets from the created IOC. The first NF may be the NSMF and the second NF may be the NSSMF.

A system disclosed herein comprises one or more network slice subnets, an IOC, and a first NF. The IOC may have at least one attribute that stores a capability information of the one or more network slice subnets. The first NF may be configured to perform at least one of the following: send a request to a second NF to determine the capability information of the one or more network slice subnets; receive a response comprising the capability information of the one or more network slice subnets from the second NF; and determine if the one or more network slice subnets can satisfy a network slice requirement, based on the received capability information. The first NF may create a new NSI if based on the received capability information, it is determined that the one or more network slice subnets cannot satisfy the network slice requirement. The first NF may continue to use an existing network slice if based on the received capability information, it is determined that the one or more network slice subnets can satisfy the network slice requirement.

The first NF may send the request to the second NF using getMOIAttributes operation. The second NF may create the IOC having the at least one attribute that includes the capability information of the one or more network slice subnets. The first NF may request the capability information through the getMOIAttributes operation to the second NF, for receiving the capability information of the one or more network slice subnets from the created IOC. The first NF may be the NSMF and the second NF may be the NSSMF.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The embodiments disclosed herein are illustrated in the accompanying drawings, throughout which like reference letters indicate corresponding parts in the various figures. The embodiments herein will be better understood from the following description with reference to the drawings, in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods and systems for managing capabilities of network slice subnets in 5G communication networks. Embodiments herein document the network slice subnet capabilities as part of a slice subnet NRM. This NRM fragment may include the existing capabilities of an already instantiated slice subnet. These capabilities can be queried by the NSMF to decide if it needs to create a new network slice instance or if it can re-use an existing instance to satisfy a network slice requirement. If the slice subnet capabilities together can satisfy the slice requirement, and if there is an existing slice instance, with the constituent network slice subnet having the same capabilities, then the existing slice may be re-used or continue to be used. Otherwise, a new network slice instance is to be created.

Referring now to the drawings, and more particularly to FIGS. 2 through 6, where similar reference characters denote corresponding features consistently throughout the figures, there are shown at least one embodiment.

Figure 2:
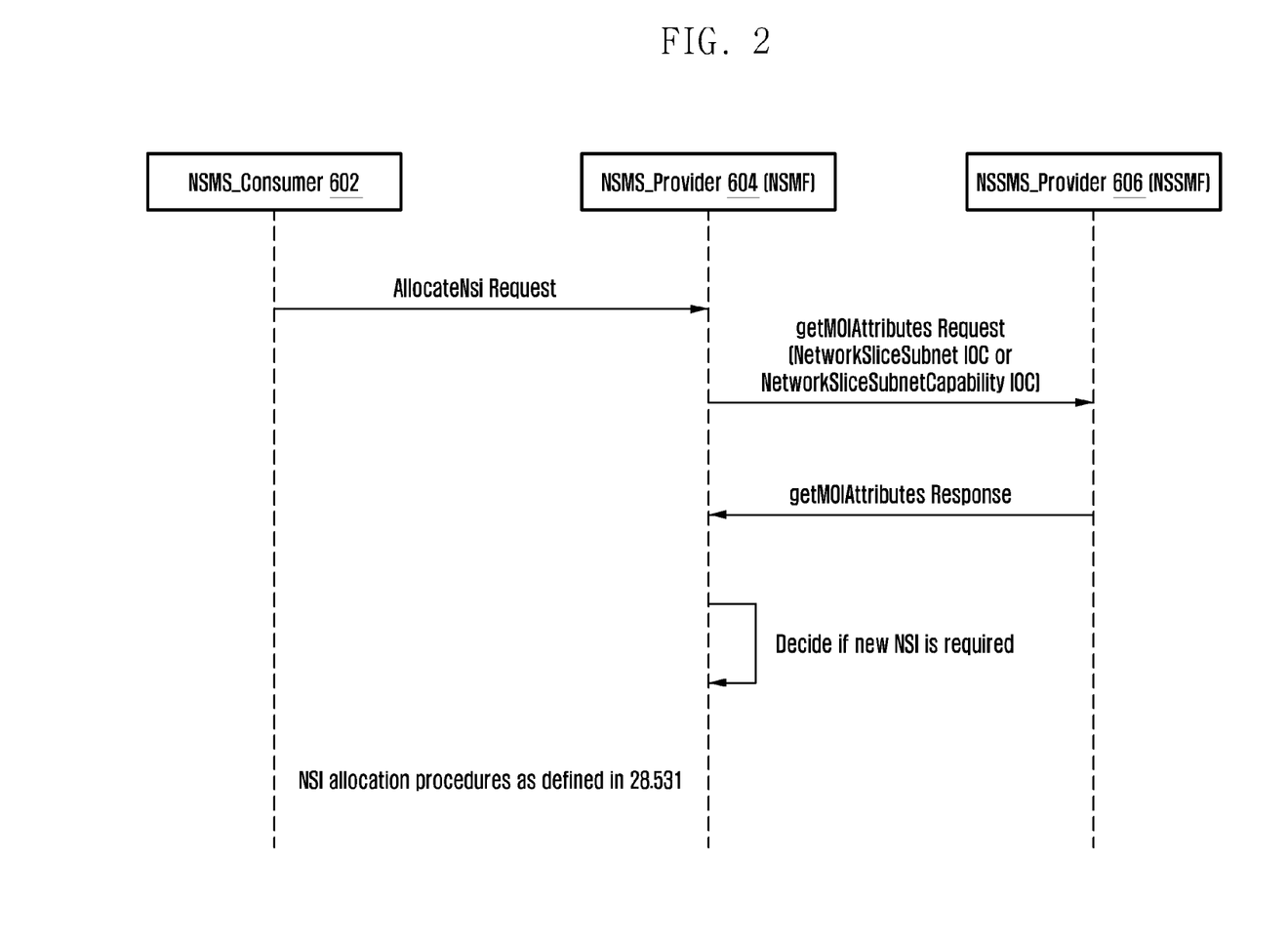
FIG. 2 illustrates a process of allocating a network slice according to embodiments as disclosed herein.

FIG. 2 illustrates a process of allocating a network slice according to embodiments as disclosed herein. The consumer 602 may transmit a AllocateNsi Request to the NSMF 604, requiring the NSMF 604 to allocate a NSI to satisfy a network slice requirement. The NSMF 604 may send a request to the NSSMF 606 to query the capabilities of the network slice subnet, in order to determine if the existing network slice subnet has the capability to satisfy the network slice requirement.

The NSMF 604 may send this request to the NSSMF 606 using the getMOIAttributes operation. There may be a NetworkSliceSubnetCapabilities IOC 608 that has at least one attribute, wherein the at least one attribute includes the capability information of the network slice subnet. The NetworkSliceSubnetCapabilities IOC 608 may be created using the createMOI operation. As illustrated in FIG. 2, the getMOIAttributes operation may either be directed to the NetworkSliceSubnet IOC or the NetworkSliceSubnetCapabilities IOC 608.

Figure 3:
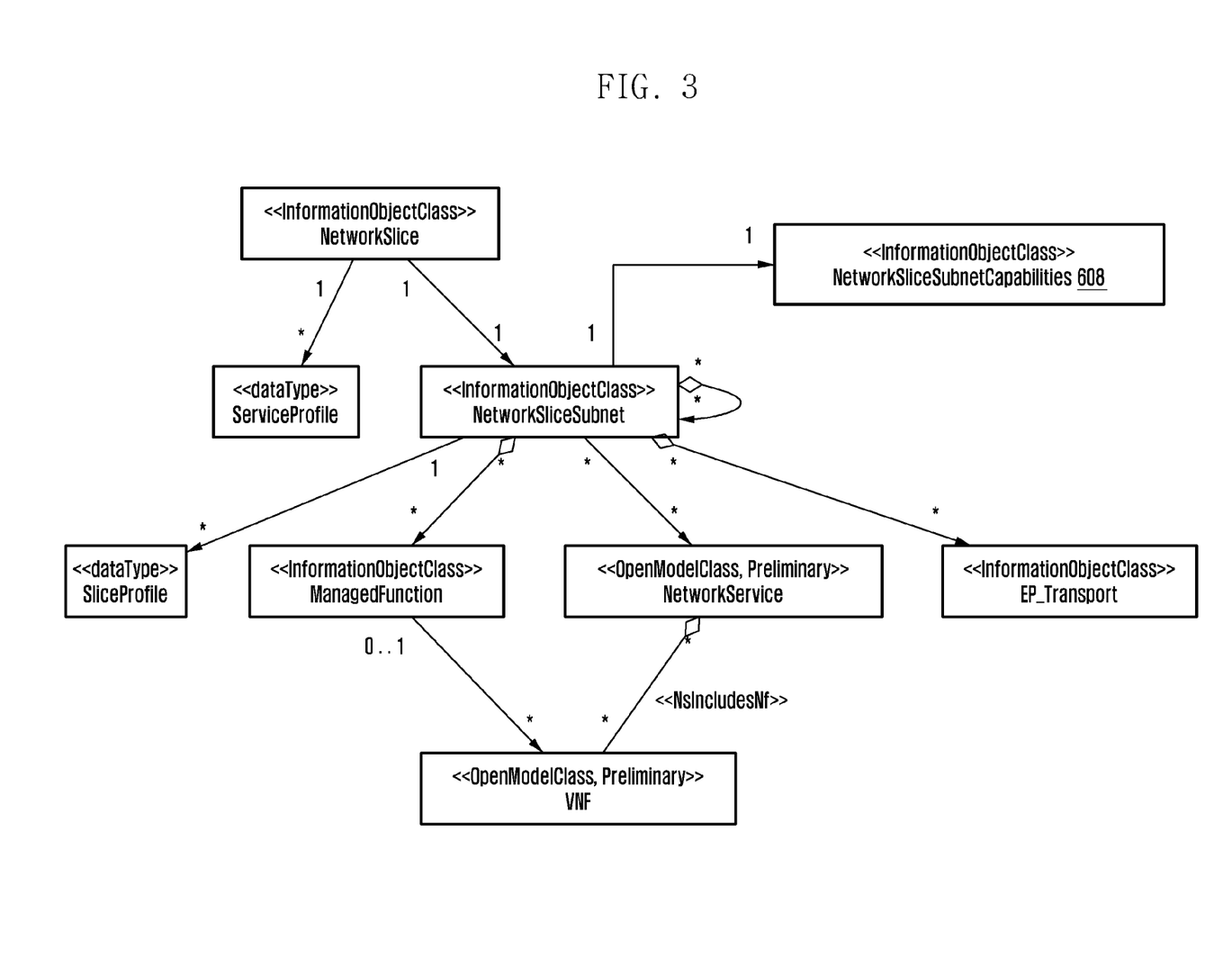
FIG. 3 illustrates the 5G slice NRM with the provided IOC containing the network slice subnet capabilities according to embodiments as disclosed herein.

In response to the request from the NSMF 604, the NSSMF 606 may provide the NSMF 604 with the capability information of the existing network slice subnet. The capability information received by the NSMF 606 may be based on what is included in the at least one attribute of the NetworkSliceSubnetCapabilities IOC 608.

according to embodiments as disclosed herein. As illustrated in FIG. 3, the provided IOC is the NetworkSliceSubnetCapabilities IOC 608. The NetworkSliceSubnetCapabilities IOC 608 can store the capabilities of the existing network slice subnet. The NSMF can query the network slice subnet capabilities using the getMOIAttributes operation, which is sent to the NSSMF 606 to receive the capability information of the existing network slice subnet. In response to the getMOIAttributes operation from the NSMF 604, the NSSMF 606 provides the NSMF 604 with the existing network slice subnet's details. These details can include the capability information of the existing network slice subnet. Based on the received capability information, the NSMF 604 can determine if the existing NSI can be used to satisfy a network slice requirement or if a new NSI is needed to satisfy the network slice requirement. The NetworkSliceSubnetCapabilities IOC 608 may be created using the createMOI operation.

In an embodiment herein, the attribute "baseObjectInstance" can include the distinguished name (DN) of the NetworkSliceSubnet IOC. The attribute scopeType can include "BASE_ALL" if the attribute scopeLevel is not supported or absent. The value "BASE_ALL" may indicate that a base object and all of its subordinate objects are selected. The attribute filter can include filtering a subnet based on their type, such as CN or RAN.

Table 1 shows example attributes that can be added to the existing NetworkSliceSubnet IOC.

TABLE 1

| Attribute | Description | Other details |
|---|---|---|
| subnetType | This attribute can define the domain that the networkslicesubnet is representing. Allowed values: CN, RAN | type: ENUM multiplicity: 1 isOrdered: N/A isUnique: N/A defaultValue: None Allowed Values: CN, RAN isNullable: False |
| NetworkSliceSubnetCapability Ref | This attribute can hold a DN of the NetworkSliceSubnetCapability IOC relating to the NetworkSliceSubnet instance. | type: DN multiplicity: 1 isOrdered: N/A isUnique: N/A defaultValue: None isNullable: False |

Upon receiving the capability information, the NSMF 604 may be able to determine if the existing network slice subnet has the capability to satisfy the network slice requirement. The AllocateNsi request may contain the network slice requirement of the network slice that is to be allocated. The NSMF 604 may compare the received capability information of the existing network slice subnet with the network requirement contained in the Allocate Nsi request to determine if the existing network slice subnet has the capability to satisfy the network slice requirement. If the existing network slice subnet has the capability, then the NSMF 604 may continue to use the existing NSI to satisfy the network slice requirement. Otherwise, a new NSI may be created to satisfy the network slice requirement.

FIG. 3 illustrates the 5G slice NRM with the provided IOC 608 containing the network slice subnet capabilities, Table 2 shows example attributes of the NetworkSliceSubnetCapabilities IOC 608.

TABLE 2

| Attribute | Qualifier | Description |
|---|---|---|
| subnetType | M | This attribute can define the type of subnet this IOC represents. Allowed Values: CN, RAN |
| coverageArea | | This attribute can specify the coverage area of the network slice subnet, i.e. the geographic region where a 3GPP communication service is accessible. |

TABLE 2-continued

| Attribute | Qualifier | Description |
|---|---|---|
| latency | O | This attribute can specify the packet transmission latency (millisecond) through the RAN, CN, and Transmission Network (TN) part of the 5G network, and is used to evaluate the utilization performance of the end-to-end network slice subnet. |
| maxNumberofUEs | O | This attribute can specify the maximum number of UEs that may simultaneously access the network slice or the network slice subnet instance. |
| dLThptPerSliceSubnet | O | This attribute can define an achievable data rate of the network slice subnet in downlink that may be available ubiquitously across the coverage area of the slice subnet. |
| dLThptPerUE | O | This attribute can define the data rate supported by the network slice subnet per UE. |
| uLThptPerSliceSubnet | O | This attribute can define the achievable data rate of the network slice subnet in uplink that may be available ubiquitously across the coverage area of the slice subnet. |
| uLThptPerUE | O | This attribute can define the data rate supported by the network slice subnet per UE. |
| maxPktSize | O | This attribute can specify the maximum packet size supported by the network slice or the network slice subnet. |
| maxNumberOfPDUSessions | O | This attribute can define the maximum number of concurrent protocol data unit (PDU) sessions supported by the network slice subnet. |
| sliceSimultaneousUse | O | This attribute can describe whether a network slice subnet can be simultaneously used by a device together with other network slice subnets and if so, with which other classes of network slice subnets. |
| delayTolerance | O | This attribute can specify the properties of service delivery flexibility, especially for the vertical services that are not chasing a high system performance. |
| energyEfficiency | O | This attribute can describe the energy efficiency, i.e. the ratio between the performance and the energy consumption (EC) when assessed during the same time frame. |
| termDensity | O | This attribute can specify the overall user density over the coverage area of the network slice subnet. |
| coverage AreaTAList | O | This attribute can specify a list of Tracking Areas for the network slice subnet. |
| resourceSharingLevel | O | This attribute can specify whether the resources to be allocated to the network slice subnet may be shared with another network slice subnet(s). Allowed Values: shared, non-shared. |
| uEMobilityLevel | O | This attribute can specify the mobility level of the UE accessing the network slice subnet. Allowed Values: stationary, nomadic, restricted mobility, fully mobility. |
| uESpeed | O | This attribute can specify the percentage value of the amount of simultaneous active UEs to the total number of UEs, where the term "active" means that the UEs are exchanging data with the network. |
| reliability | O | This attribute can specify, in the context of network layer packet transmissions, a percentage value that denotes a reliability, wherein the reliability is calculated by looking at the number of sent network layer packets that were successfully delivered to a given system entity within a time constraint required by the targeted service, and then dividing this number by the total amount of sent network layer packets. |
| serviceType | O | This attribute can specify the standardized network slice type. Allowed Values: eMBB, URLLC, MIoT, V2X. |
| deterministicComm | O | This attribute can specify the properties of the deterministic communication for periodic user traffic. |
| survivalTime | O | This attribute can specify the time that an application consuming a communication service may continue without an anticipated message. |
| positioning | O | This attribute can specify whether the network slice subnet provides geo-localization methods or supporting methods. |
| synchronicity | O | This attribute can specify whether synchronicity of communication devices is supported. Two cases may be most important in this context: —Synchronicity between a base station and a mobile device andSynchronicitybetween mobile devices. |

Figure 4:
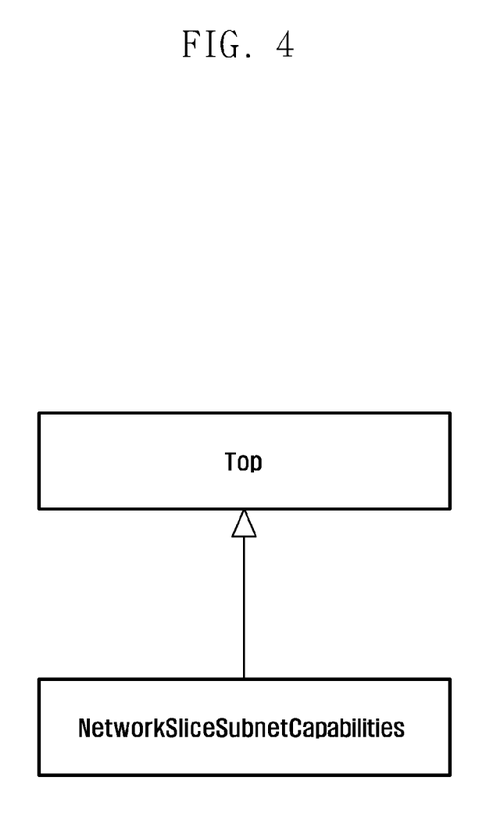
FIG. 4 illustrates the NetworkSliceSubnetCapabilities IOC inheriting the capabilities from the top according to embodiments as disclosed herein.

FIG. 4 illustrates the NetworkSliceSubnetCapabilities IOC 608 inheriting the capabilities from the top according to embodiments as disclosed herein. The NetworkSliceSubnetCapabilities IOC 608 may also additionally include all the attributes of the IOCs above it.

Figure 5:
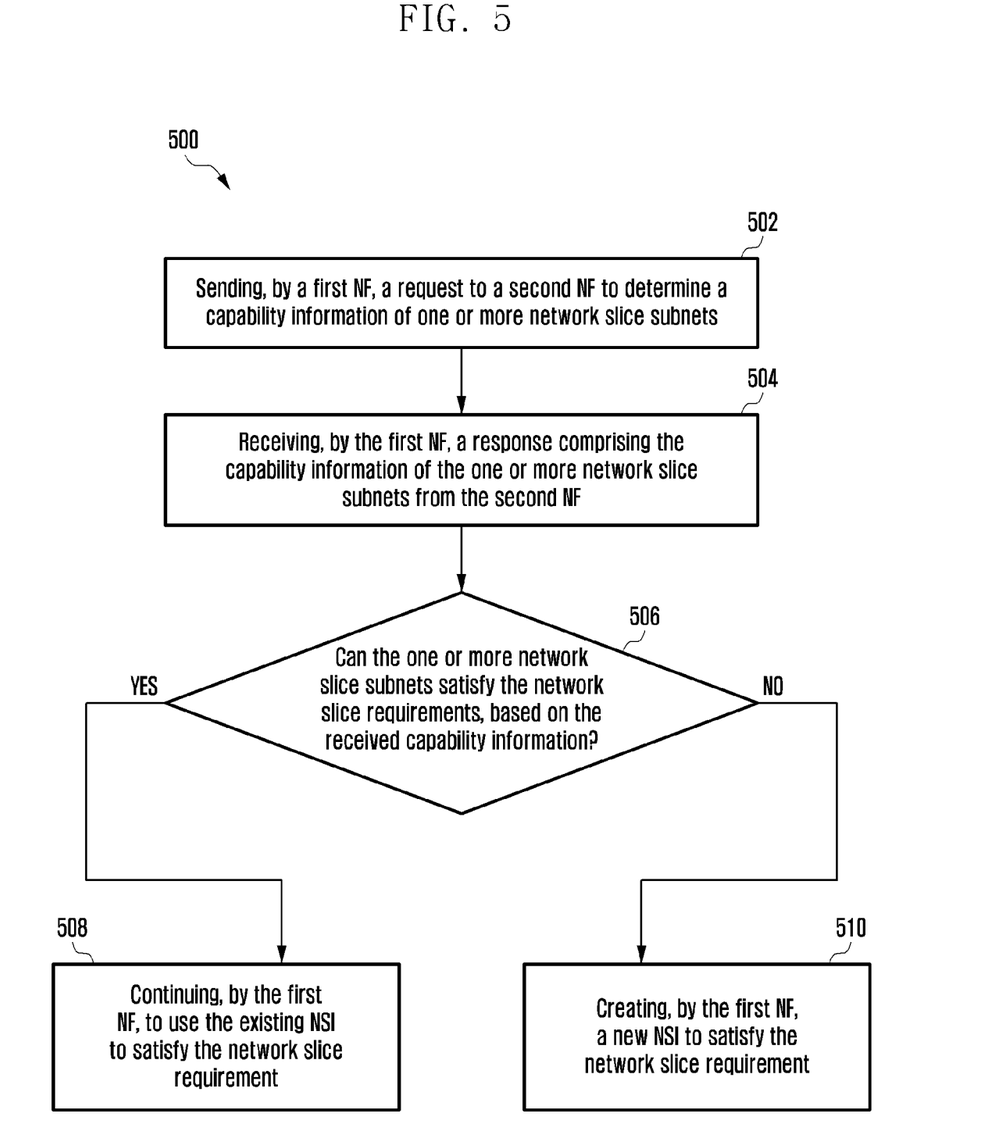
FIG. 5 illustrates a method for allocating a network slice to meet a network slice requirement, according to embodiments as disclosed herein.

FIG. 5 illustrates a method for allocating a network slice to meet a network slice requirement according to embodiments as disclosed herein.

At step 502, a first NF may send a request to a second NF to determine a capability information of one or more network slice subnets. The first NF may be the NSMF 604, and the second NF may be the NSSMF 606. The capability information of the one or more network slice subnets may be present in at least one attribute present in an IOC. This IOC may be the NetworkSliceSubnetCapabilities IOC 608. The request sent by the first NF may be the getMOIAttributes operation, which allows the first NF to receive the capability information through the at least one attribute present in the NetworkSliceSubnetCapabilities IOC 608.

At step 504, the first NF may receive a response from the second NF, wherein the response comprises the capability information of the one or more network slice subnets.

At step 506, based on the received capability information, the first NF may determine if the one or more network slice subnets have the capability to satisfy a network slice requirement. The first NF may compare the received capability information with the network slice requirement to determine if the one or more network slice subnets have the capability to satisfy the network slice subnet.

At step 508, if the one or more network slice subnets have the capability to satisfy the network slice requirement, then the first NF may continue to use an existing NSI to satisfy the network slice requirement.

At step 510, if the one or more network slice subnets do not have the capability to satisfy the network slice requirement, then the first NF may create a new NSI to satisfy the network slice requirement.

The various actions in method 500 may be performed in the order presented, in a different order or simultaneously. Further, in some embodiments, some actions listed in FIG. 5 may be omitted.

Figure 6:
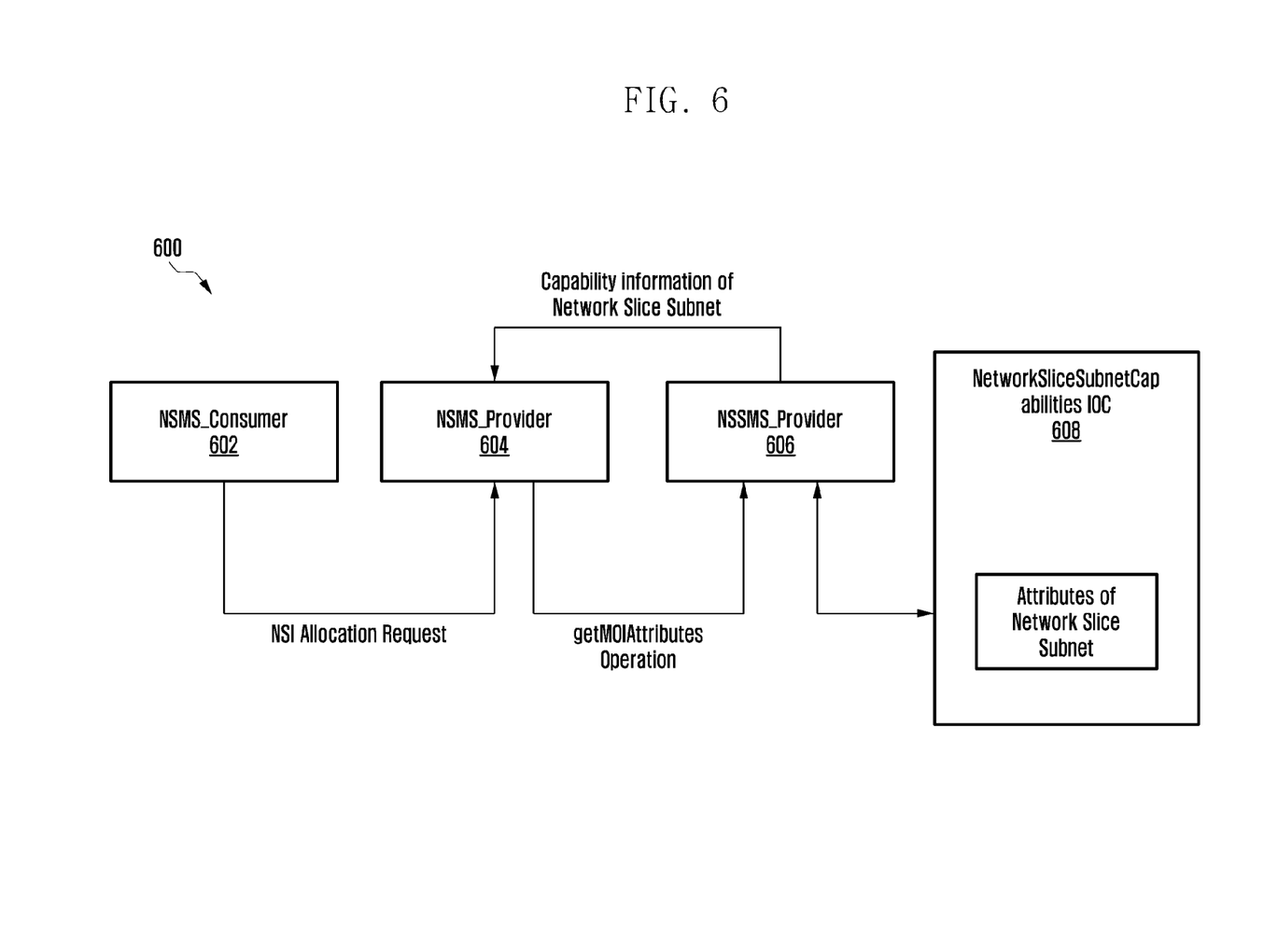
FIG. 6 illustrates a system diagram for receiving the capability information of a network slice subnet and deciding if a new network slice instance or an existing network slice instance can satisfy a network slice requirement, according to embodiments as disclosed herein.

FIG. 6 illustrates a system 600 for receiving the capability information of a network slice subnet and deciding if a new network slice instance or an existing network slice instance can satisfy a network slice requirement according to embodiments as disclosed herein.

The NSMS_Consumer 602 may send a request to the NSMS_Provider 604 (NSMF) for allocation of a network slice instance. The NSMS_Provider 604 may invoke the getMOIAttributes operation to request the NSS_Provider 606 to provide the NSMS_Provider 604 with the capability information of the existing network slice subnet. The capability information of the existing network slice subnet may be stored in at least one attribute present in the NetworkSliceSubnetCapabilities IOC 608. The NSSMS_Provider 606 may receive this capability information from the NetworkSliceSubnetCapabilities IOC 608, and then provide the capability information to the NSMS_Provider 604. Based on this capability information, the NSMS_Provider 604 can determine if the existing network slice can satisfy the network slice requirement. If the existing network slice can satisfy the network slice requirement, then the NSMS_Provider 604 (e.g., NSMF) may continue to use the existing network slice. If the existing network slice cannot satisfy the network slice requirement, then a new network slice is created to satisfy the network slice requirement.

Figure 7:
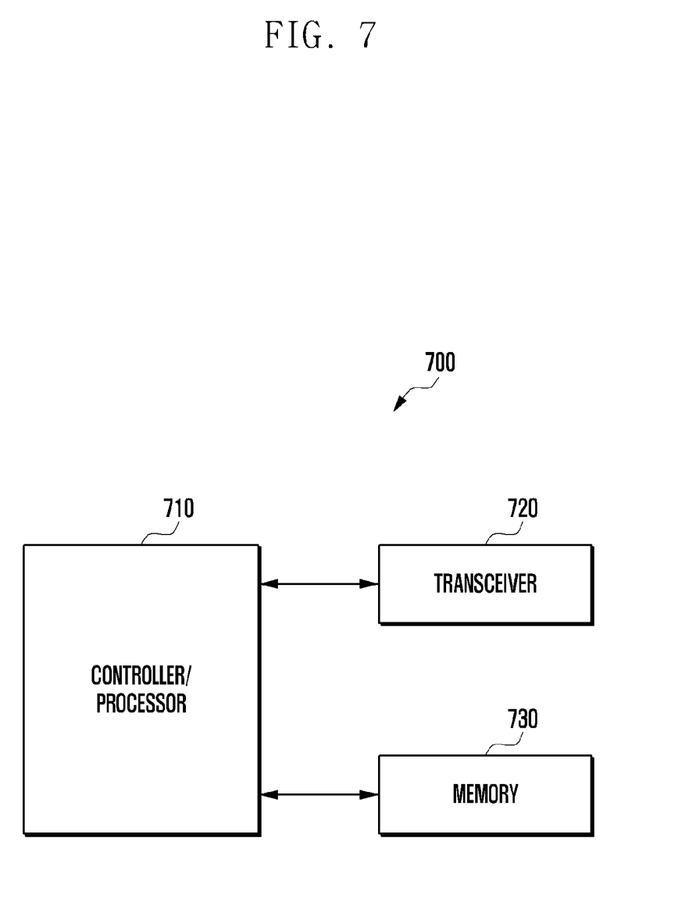
FIG. 7 illustrates a user equipment (UE) according to embodiments of the present disclosure.

FIG. 7 illustrates a user equipment (UE) according to embodiments of the present disclosure.

Referring to the FIG. 7, the UE 700 may include a controller/processor 710, a transceiver 720 and a memory 730. However, all of the illustrated components are not essential. The UE 700 may be implemented using more or fewer components than those illustrated in FIG. 7. In addition, the controller/processor 710 and the transceiver 720 and the memory 730 may be implemented as a single chip according to another embodiment.

The aforementioned components will now be described in detail.

The controller/processor 710 may include one or more controller/processors or other processing devices that control the proposed function, process, and/or method. Operation of the UE 700 may be implemented by the controller/processor 710.

The transceiver 720 may include an RF transmitter for up-converting and amplifying a transmitted signal, and an RF receiver for down-converting a frequency of a received signal. However, according to another embodiment, the transceiver 720 may be implemented using more or fewer components.

The transceiver 720 may be connected to the controller/processor 710 and transmit and/or receive a signal. The signal may include control information and data. In addition, the transceiver 720 may receive the signal through a wireless channel and output the signal to the controller/processor 710. The transceiver 720 may transmit a signal output from the controller/processor 710 through the wireless channel.

The memory 730 may store the control information or the data included in a signal obtained by the UE 700. The memory 730 may be connected to the controller/processor 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

Figure 8:
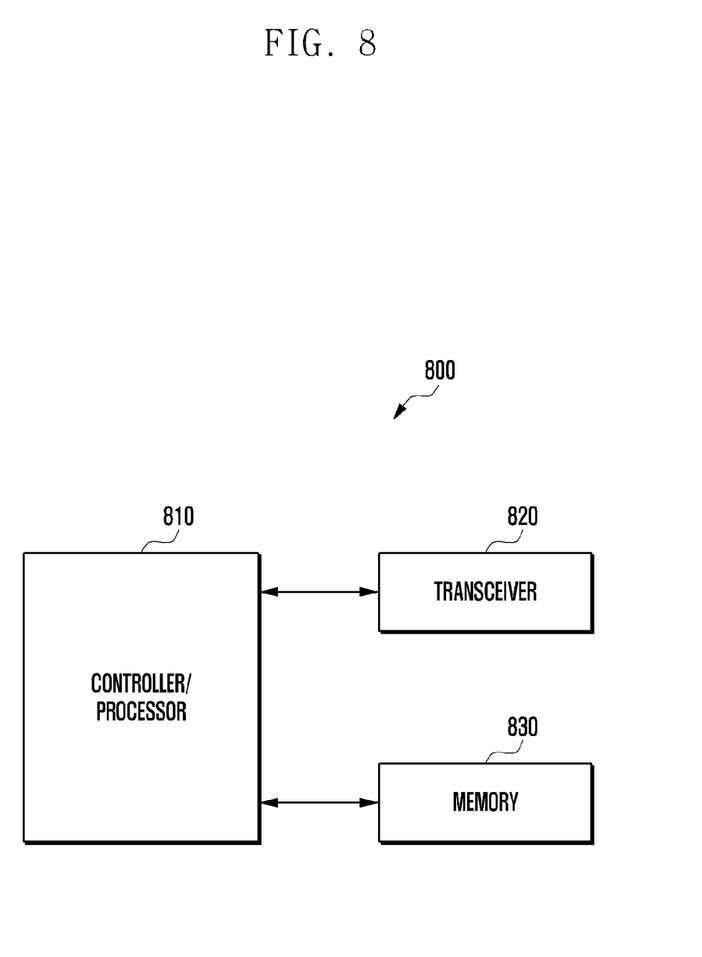
FIG. 8 illustrates a block diagram of a network function (NF) entity according to embodiments of the present disclosure.

FIG. 8 illustrates a block diagram of a network function (NF) entity according to embodiments of the present disclosure.

Referring to the FIG. 8, the NF entity 800 may include a controller/processor 810, a transceiver 820 and a memory 830. However, all of the illustrated components are not essential. The NF entity 800 may be implemented using more or fewer components than those illustrated in FIG. 8. In addition, the controller/processor 810 and the transceiver 820 and the memory 830 may be implemented as a single chip according to another embodiment.

The aforementioned components will now be described in detail.

The controller/processor 810 may include one or more controller/processors or other processing devices that control the proposed function, process, and/or method. Operation of the NF entity 800 may be implemented by the controller/processor 810.

The transceiver 820 may include an RF transmitter for up-converting and amplifying a transmitted signal, and an RF receiver for down-converting a frequency of a received signal. However, according to another embodiment, the transceiver 820 may be implemented using more or fewer components.

The transceiver 820 may be connected to the controller/processor 810 and transmit and/or receive a signal. The signal may include control information and data. In addition, the transceiver 820 may receive the signal through a wireless channel and output the signal to the controller/processor 810. The transceiver 820 may transmit a signal output from the controller/processor 810 through the wireless channel.

The memory 830 may store the control information or the data included in a signal obtained by the NF entity 800. The memory 830 may be connected to the controller/processor 810 and store at least one instruction or a protocol or a parameter for the proposed function, process, and/or method. The memory 830 may include read-only memory (ROM) and/or random access memory (RAM) and/or hard disk and/or CD-ROM and/or DVD and/or other storage devices.

Embodiments herein enable documentation of existing slice subnet capabilities and features in 5G slice NRM. It may be possible for a NSMS_Provider 604 (also referred to herein as "NSMF") to decide if an existing network slice instance can be used, for the incoming slice allocation request, or a new NSI may be created. This may enable better utilization of the resources and the consumption of the existing network slice instance to the fullest.

It is to be noted that while the embodiments disclosed herein involve the capability information of the existing network slice subnet being stored in at least one attribute of an IOC, this is to be construed as non-limiting as there may be other means in which the capability information of the existing network slice subnet may be stored. It is also to be noted that while the embodiments disclosed herein involve the NSMF 604 invoking the getMOIAttributes operation to receive the capability information of the existing network slice subnet, this is to be construed as non-limiting as there may be other operations or other means by which the NSMF 604 may obtain the capability information of the existing network slice subnet.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

What is claimed:

1. A method performed by a first communication node for network slice subnet management in a wireless communication system, the method comprising:
   transmitting, to a second communication node, a query message to obtain capability information of a network slice subnet for a NetworkSliceSubnetCapabilities information object class (IOC); and
   receiving, from the second communication node, a capability information message as a response to the query message, the capability information message comprising the capability information of the network slice subnet,
   wherein the NetworkSliceSubnetCapabilities IOC stores at least one attribute associated with the capability information of the network slice subnet.

2. The method of claim 1, wherein the NetworkSliceSubnetCapabilities IOC includes a first attribute including information on a packet transmission latency through the network slice subnet, a second attribute including information on a data rate of the network slice subnet in a downlink that is available ubiquitously across a coverage area of the network slice subnet, a third attribute including information on a data rate of the network slice subnet in an uplink that is available ubiquitously across the coverage area of the network slice subnet, and a fourth attribute including information on at least one of tracking areas (TAs) for the network slice subnet.

3. The method of claim 1, wherein the query message is sent using a getMOIAttributes operation.

4. The method of claim 1, wherein the first communication node includes a network slice management function (NSMF) and the second communication node includes a network slice subnet management function (NSSMF).

5. A method performed by a second communication node for network slice subnet management in a wireless communication system, the method comprising:
   receiving, from a first communication node, a query message to obtain capability information of a network slice subnet for a NetworkSliceSubnetCapabilites information object class (IOC); and
   transmitting, to the first communication node, a capability information message as a response to the query message, the capability information message comprising the capability information of the network slice subnet,
   wherein the NetworkSliceSubnetCapabilities IOC stores at least one attribute associated with the capability information of the network slice subnet.

6. The method of claim 5, wherein the NetworkSliceSubnetCapabilities IOC includes a first attribute including information on a packet transmission latency through the network slice subnet, a second attribute including information on a data rate of the network slice subnet in a downlink that is available ubiquitously across a coverage area of the network slice subnet, a third attribute including information on a data rate of the network slice subnet in an uplink that is available ubiquitously across the coverage area of the network slice subnet, and a fourth attribute including information on at least one of tracking areas (TAs) for the network slice subnet.

7. The method of claim 5, wherein the query message is sent using a getMOIAttributes operation.

8. The method of claim 5, wherein the first communication node includes a network slice management function (NSMF) and the second communication node inlcudes a network slice subnet management function (NSSMF).

9. A first communication node for network slice subnet management in a wireless communication system, the first communication node comprising:
   a transceiver, and
   a controller configured to:
   transmit, to a second communication node via the transceiver, a query message to obtain capability information of a network slice subnet for a NetworkSliceSubnetCapabilities information object class (IOC); and
   receive, from the second communication node via the transceiver, a capability information message as a response to the query message, the capability information message comprising the capability information of the network slice subnet,
   wherein the NetworkSliceSubnetCapabilities IOC stores at least one attribute associated with the capability information of the network slice subnet.

10. The first communication node of claim 9, wherein the NetworkSliceSubnetCapabilities IOC includes a first attribute including information on a packet transmission latency through the network slice subnet, a second attribute including information on a data rate of the network slice subnet in a downlink that is available ubiquitously across a coverage area of the network slice subnet, a third attribute including information on a data rate of the network slice subnet in an uplink that is available ubiquitously across the coverage area of the network slice subnet, and a fourth attribute including information on at least one of tracking areas (TAs) for the network slice subnet.

11. The first communication node of claim 9, wherein the query message is sent using a getMOIAttributes operation.

12. The first communication node of claim 9, wherein the first communication node includes a network slice management function (NSMF) and the second communication node includes a network slice subnet management function (NSSMF).

13. A second communication node for network slice subnet management in a wireless communication system, the second communication node comprising:
- a transceiver, and
- a controller configured to:
  - receive, from a first communication node via the transceiver, a query message to obtain capability information of a network slice subnet for a NetworkSliceSubnetCapabilities information object class (IOC); and
  - transmit, to the first communication node via the transceiver, a capability information message as a response to the query message, the capability information message comprising the capability information of the network slice subnet,
- wherein the NetworkSliceSubnetCapabilities IOC stores at least one attribute associated with the capability information of the network slice subnet.

14. The second communication node of claim 13, wherein the NetworkSliceSubnetCapabilities IOC includes a first attribute including information on a packet transmission latency through the network slice subnet, a second attribute including information on a data rate of the network slice subnet in a downlink that is available ubiquitously across a coverage area of the network slice subnet, a third attribute including information on a data rate of the network slice subnet in an uplink that is available ubiquitously across the coverage area of the network slice subnet, and a fourth attribute including information on at least one of tracking areas (TAs) for the network slice subnet.

15. The second communication node of claim 13, wherein the query message is sent using a getMOIAttributes operation.

16. The second communication node of claim 13, wherein the first communication node includes a network slice management function (NSMF) and the second communication node includes a network slice subnet management function (NSSMF).

* * * * *